United States Patent
Motes et al.

(10) Patent No.: US 9,552,142 B2
(45) Date of Patent: Jan. 24, 2017

(54) SYSTEMS AND METHODS FOR DISPLAYING FILE AND FOLDER INFORMATION TO A USER

(71) Applicant: Dropbox, Inc., San Francisco, CA (US)

(72) Inventors: Aston Motes, San Francisco, TX (US); Ivan Kirigin, San Mateo, CA (US); Olumakinde Adegboyega Adeagbo, San Francisco, CA (US); Yi Wei, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 358 days.

(21) Appl. No.: 14/137,593

(22) Filed: Dec. 20, 2013

(65) Prior Publication Data

US 2014/0108955 A1  Apr. 17, 2014

Related U.S. Application Data

(63) Continuation of application No. 13/614,783, filed on Sep. 13, 2012, now Pat. No. 8,645,466.

(60) Provisional application No. 61/649,208, filed on May 18, 2012.

(51) Int. Cl.
  *G06F 3/048* (2013.01)
  *G06F 3/0484* (2013.01)
  *G06F 3/0482* (2013.01)
  *G06F 17/30* (2006.01)

(52) U.S. Cl.
  CPC ........... *G06F 3/0484* (2013.01); *G06F 3/0482* (2013.01); *G06F 17/30126* (2013.01)

(58) Field of Classification Search
  CPC ..................... G06F 17/30247; G06F 17/30244
  See application file for complete search history.

(56) References Cited

U.S. PATENT DOCUMENTS

| | | |
|---|---|---|
| 6,820,111 B1 | 11/2004 | Rubin et al. |
| 7,443,418 B2 | 10/2008 | Bryant et al. |
| 7,493,396 B2 | 2/2009 | Alcorn et al. |
| 7,941,819 B2 | 5/2011 | Stark et al. |
| 8,300,257 B2 | 10/2012 | Hirayama et al. |
| 8,352,549 B2 | 1/2013 | Sacco et al. |
| 2002/0122063 A1* | 9/2002 | Weinberg ............... G06F 3/0481 715/764 |
| 2002/0129368 A1* | 9/2002 | Schlack ................. G06Q 30/02 725/46 |
| 2002/0135621 A1* | 9/2002 | Angiulo ............... G06F 17/3089 715/838 |
| 2004/0054670 A1 | 3/2004 | Noff et al. |
| 2004/0143667 A1 | 7/2004 | Jerome |
| 2004/0165789 A1 | 8/2004 | Li |
| 2004/0221309 A1 | 11/2004 | Zaner et al. |

(Continued)

*Primary Examiner* — William Bashore
*Assistant Examiner* — Rayeez Chowdhury
(74) *Attorney, Agent, or Firm* — Polsinelli PC

(57) ABSTRACT

A system for displaying the listings of files and/or folders in one of a plurality of different views (e.g., gallery view or list view). In particular embodiments, the system determines which of the views to display in the listings in based on: (1) the types of files to be displayed; (2) a specified preference of a content sharer; and/or (3) a specified preference of a content recipient. Various embodiments are particularly useful for displaying lists of files that a content sharer shares with a content recipient via a URL within the context of a synched file sharing system.

20 Claims, 9 Drawing Sheets

(56) References Cited

U.S. PATENT DOCUMENTS

| | | |
|---|---|---|
| 2005/0062888 A1 | 3/2005 | Wood et al. |
| 2005/0210414 A1 | 9/2005 | Angiulo et al. |
| 2005/0246331 A1 | 11/2005 | De Vorchik et al. |
| 2005/0278328 A1 | 12/2005 | Marston et al. |
| 2006/0004914 A1 | 1/2006 | Kelly et al. |
| 2006/0248192 A1 | 11/2006 | Morris, III et al. |
| 2007/0242285 A1 | 10/2007 | Ahn |
| 2008/0040388 A1 | 2/2008 | Petri et al. |
| 2008/0158615 A1* | 7/2008 | Parkos ............... B07C 3/14 358/402 |
| 2008/0159708 A1 | 7/2008 | Kazama et al. |
| 2008/0174570 A1 | 7/2008 | Jobs et al. |
| 2008/0189616 A1 | 8/2008 | Covel et al. |
| 2008/0216140 A1 | 9/2008 | Liwerant et al. |
| 2008/0229302 A1* | 9/2008 | Kufeldt ............... G06F 21/10 717/173 |
| 2008/0288499 A1 | 11/2008 | Choi et al. |
| 2008/0306954 A1 | 12/2008 | Hornqvist |
| 2008/0307504 A1 | 12/2008 | Cisler et al. |
| 2009/0022123 A1* | 1/2009 | Bae ............... G06Q 30/02 370/338 |
| 2009/0089844 A1* | 4/2009 | Beyabani ........... H04N 7/17318 725/87 |
| 2009/0106666 A1 | 4/2009 | Nomura |
| 2009/0150792 A1 | 6/2009 | Laakso et al. |
| 2009/0177754 A1 | 7/2009 | Brezina et al. |
| 2009/0204646 A1 | 8/2009 | Park |
| 2009/0234667 A1 | 9/2009 | Thayne |
| 2009/0234876 A1 | 9/2009 | Schigel et al. |
| 2009/0254643 A1 | 10/2009 | Terheggen et al. |
| 2009/0300473 A1 | 12/2009 | Adams et al. |
| 2009/0300511 A1 | 12/2009 | Behar et al. |
| 2009/0307086 A1 | 12/2009 | Adams et al. |
| 2009/0309981 A1 | 12/2009 | Sorensen et al. |
| 2009/0320050 A1 | 12/2009 | Pousti et al. |
| 2009/0327961 A1 | 12/2009 | De Vorchik et al. |
| 2010/0023555 A1 | 1/2010 | Macaskill |
| 2010/0070899 A1 | 3/2010 | Hunt et al. |
| 2010/0146450 A1 | 6/2010 | Harada |
| 2010/0185965 A1 | 7/2010 | Davidson et al. |
| 2010/0287104 A1 | 11/2010 | Leroy |
| 2011/0061099 A1 | 3/2011 | Jiang et al. |
| 2011/0107241 A1 | 5/2011 | Moore |
| 2011/0113133 A1 | 5/2011 | Kelly et al. |
| 2011/0137986 A1 | 6/2011 | Wolf |
| 2011/0248831 A1 | 10/2011 | Bloebaum et al. |
| 2011/0276423 A1 | 11/2011 | Davidson |
| 2012/0063680 A1 | 3/2012 | Daisy |
| 2012/0066602 A1 | 3/2012 | Chai et al. |
| 2012/0166569 A1 | 6/2012 | Kumar |
| 2012/0179993 A1 | 7/2012 | Himberger et al. |
| 2012/0209892 A1 | 8/2012 | MacAskill et al. |
| 2012/0215813 A1 | 8/2012 | Fiducci |
| 2012/0259737 A1 | 10/2012 | Pousti et al. |
| 2012/0272180 A1 | 10/2012 | Larres et al. |
| 2012/0278404 A1 | 11/2012 | Meisels et al. |
| 2012/0293492 A1 | 11/2012 | Kuroume et al. |

* cited by examiner

SYSTEMS AND METHODS FOR DISPLAYING FILE AND FOLDER INFORMATION TO A USER

CROSS REFERENCE TO RELATED APPLICATIONS

This application is a continuation application of U.S. application Ser. No. 13/614,783 filed on Sep. 13, 2012, entitled SYSTEMS AND METHODS FOR DISPLAYING FILE AND FOLDER INFORMATION TO A USER, which is incorporated by reference.

BACKGROUND

Current file sharing systems allow content sharers to use various techniques to share folders and/or files with content recipients. However, current systems often display file listings in an inefficient or unattractive manner. Accordingly, there is a need for improved systems and methods for displaying file and folder information within the context of file sharing systems.

SUMMARY

A computer-implemented method, according to a particular embodiment, comprises: (A) receiving, from a content sharer in a computerized content sharing system, an indication that the content sharer wishes to share content stored within the content sharing system with a content recipient; (B) determining whether the content includes one or more files that are suitable for display in gallery view format; (C) in response to determining that the content includes one or more files that are suitable for display in gallery view format, creating a gallery view link that the content sharer may share with the content recipient, the gallery view link being selectable to view a listing of the one or more files in gallery view format; (D) in response to determining that the content does not include one or more files that are suitable for display in gallery view format, creating a list view link that the content sharer may share with the content recipient, the list view link being selectable to view a listing of the one or more files in list view format; and (E) providing at least one of the gallery view link or the list view link to the content sharer for use in sharing the at least one file with the content recipient.

A computer-implemented method, according to a further embodiment, comprises: (A) receiving first data indicating that a content sharer wishes to share content stored within a computerized content sharing system with a content recipient; (B) at least partially in response to receiving the first data, creating a link that the content sharer may share with the content recipient, the link being selectable to view a listing of the one or more files in a first default view format; (C) after creating the link, providing the link to the content sharer for use in sharing the one or more files with the content recipient; (D) receiving second data indicating that the content sharer wishes to allow the content recipient to view the listing of the one or more files in a second default view format; and (E) at least partially in response to receiving the second data, taking action to allow the content sharer to share a link with the content recipient that is selectable to view a listing of the one or more files in the second default view format.

A computer-implemented method, according to yet another embodiment, comprises: (A) receiving first data indicating that the content sharer wishes to share content stored within the content sharing system with a content recipient; (B) at least partially in response to receiving the first data, creating a link that the content sharer may share with the content recipient, the link being selectable to view a listing of the one or more files in a first default view format; (C) after creating the link, providing the link to the content sharer for use in sharing the at least one file with the content recipient; (D) receiving second data indicating that the content recipient wishes to view the listing of the one or more files, by default, in a second view format; and (E) at least partially in response to receiving the second data, providing the content recipient with a web page displaying the one or more files in the second default view format.

BRIEF DESCRIPTION OF THE DRAWINGS

Various embodiments of a computer system for displaying file and folder information to a user are described below. In the course of this description, reference will be made to the accompanying drawings, which are not necessarily drawn to scale, and wherein.

DETAILED DESCRIPTION OF VARIOUS EMBODIMENTS

Various embodiments of the present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Computer systems and methods, according to various embodiments, allow a user (e.g., a content sharer, or "sharer") to send a link (e.g., a URL) to another user (e.g., a content recipient, or "recipient") that the recipient may use to view a listing of files or folders selected by the content sharer. In particular embodiments, this is done within the context of a synched file system such as the Dropbox service of Dropbox, Inc. of San Francisco, Calif. by, for example, using a link sharing feature. An example of a suitable link sharing system is described in U.S. patent application Ser.

No. 13/217,944, entitled "File Sharing Via Link Generation," which was filed on Aug. 25, 2011, and which is hereby incorporated by reference in its entirety.

In particular embodiments, a content sharer may send a link to a content recipient by, for example: (1) copying the link from a URL box in the content sharer's web browser; (2) pasting the link into an e-mail or text message; and (3) sending the e-mail or text message to the content recipient. Alternatively, the content sharer may share the link in any other manner, such as by posting the link to a web site, copying the link to a file, or verbally conveying the link to the content recipient. The content recipient may then view a listing of the files or folders in his or her web browser by, for example, selecting the link or by manually pasting or typing the link into their browser. The user may then access one or more of the files or folders by selecting the files or folders from the listing (e.g., by "clicking" on the desired file or folder).

In particular embodiments, the system is adapted to display listings of files and/or folders in any of a plurality of formats. Such formats may include, for example, a gallery view and a list view, which are each discussed below.

Gallery View

Figure 5:
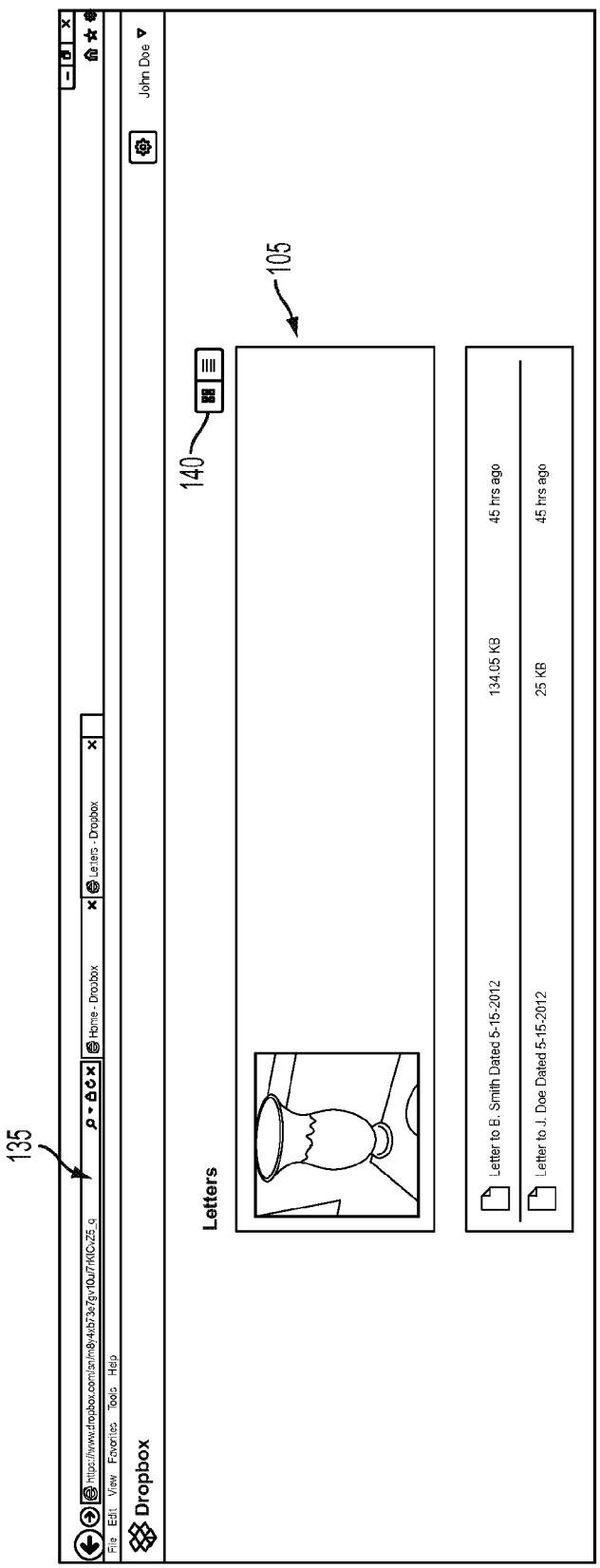
FIG. 5 is a get link screen for the Letters folder shown in FIG. 1. The listed files and folders are shown in gallery format.
Figure 6:
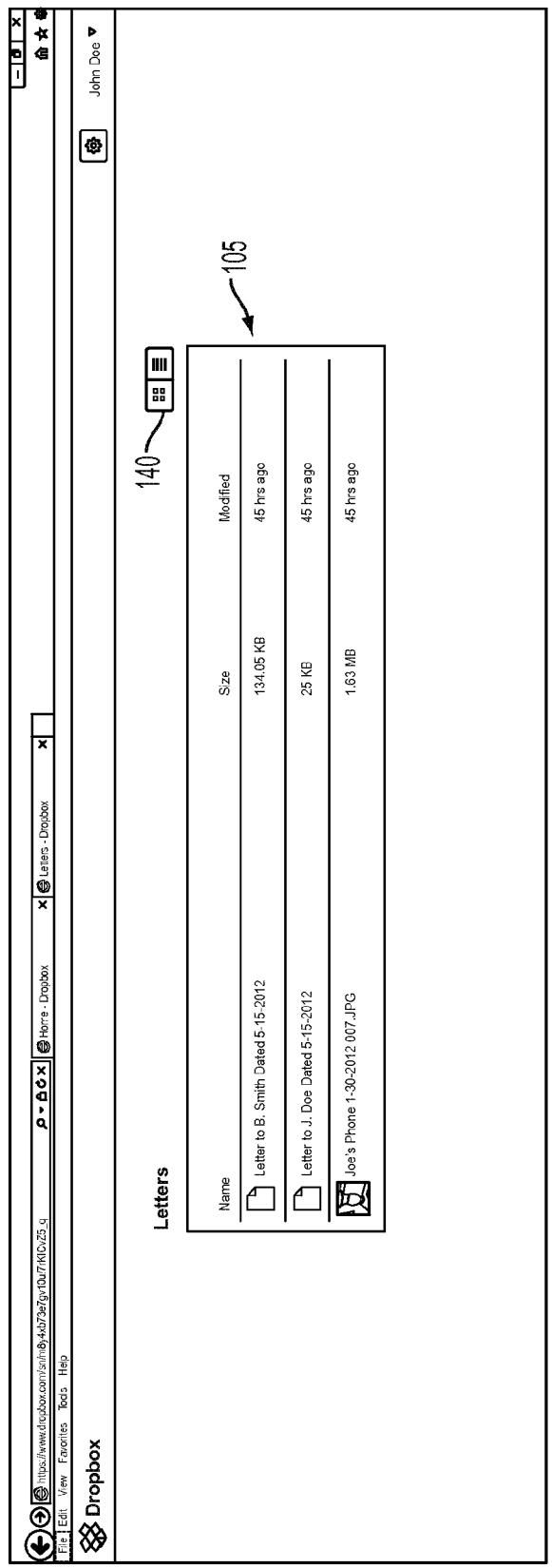
FIG. 6 is a get link screen for the Letters folder shown in FIG. 1. The listed files and folders are shown in list format.

In a particular embodiment, when files and/or folders are displayed in gallery format: (1) certain types of files (e.g., media files such as picture, video, and PowerPoint files) are displayed as a preview image (e.g., a large thumbnail view of an image) with no file name adjacent the preview image; and (2) folders and other types of files (e.g., text files and other types of files, such as .pdf files) are displayed in a list format that displays (e.g., for only such files or folders) a listing like that described below for all files and folders in List View. As a particular example, in the gallery view shown in FIG. 5, an image file 105 is displayed as a preview image and a listing of non-image files is displayed in list format below the image 105.

The system may also be configured so that, when it displays files in gallery format, predetermined types of files are displayed on different portions of the screen. For example, in a particular embodiment, such as the embodiment of FIG. 5, the files and/or folders to be shared are displayed so that: (1) any folders are displayed in list format at the top of the page; (2) any media files are displayed in the middle of the page in either preview image or list format (e.g., depending on the type of media file involved); and (3) any remaining files are displayed in list format at the bottom of the page.

In certain embodiments, a gallery view display may be broken down into more specific sections than discussed above. For example, the media section may be broken down into subcategories, such as audio files and photos.

In various embodiments, when image files are displayed in gallery format, the system is configured to display the name of the file in response to a user using a pointing device (e.g., a mouse) to "hover" over the image. Also, in particular embodiments, in gallery view format, the system is adapted to create customized previews of image files by cropping an image from within the file.

List View

Figure 1:
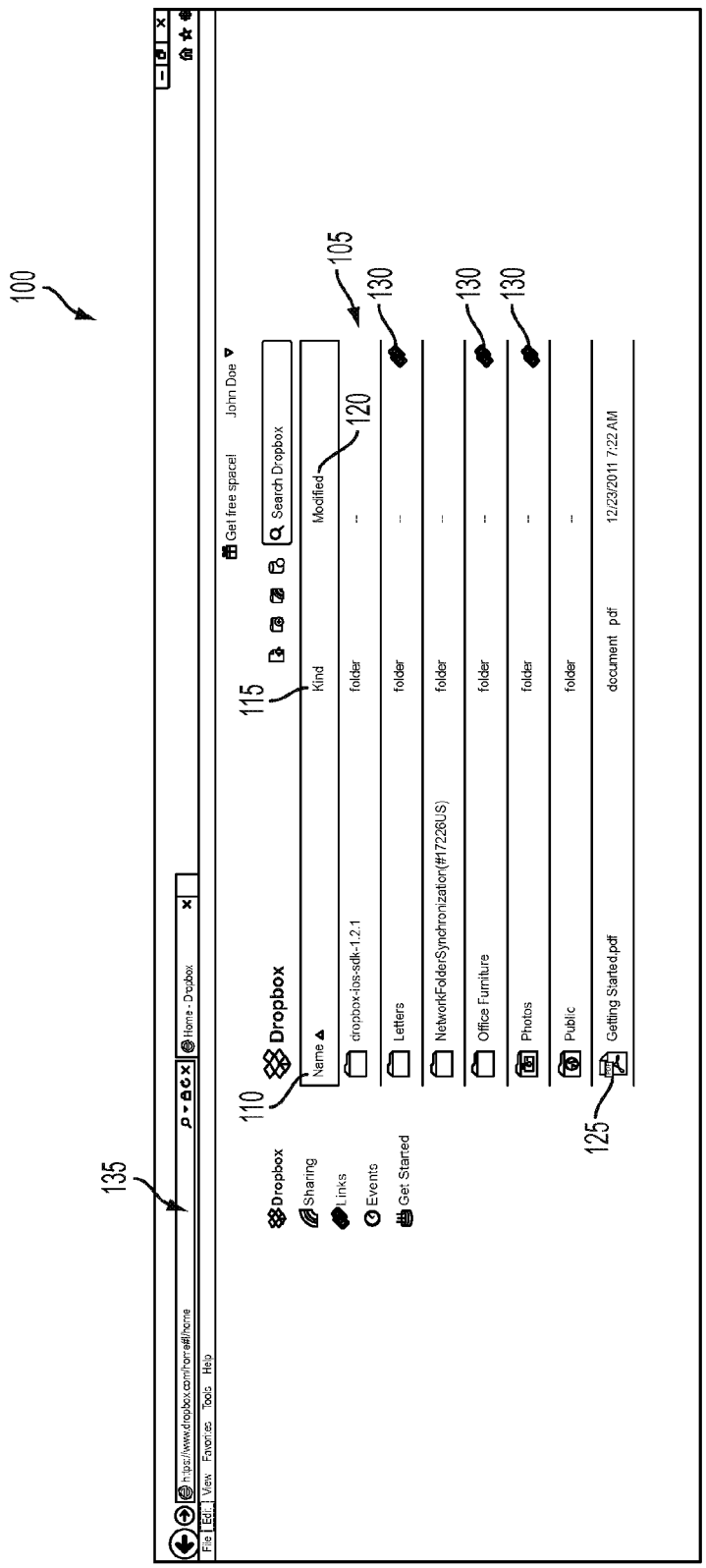
FIG. 1 shows a "home" page of a File Management System according to a particular embodiment.
Figure 2:
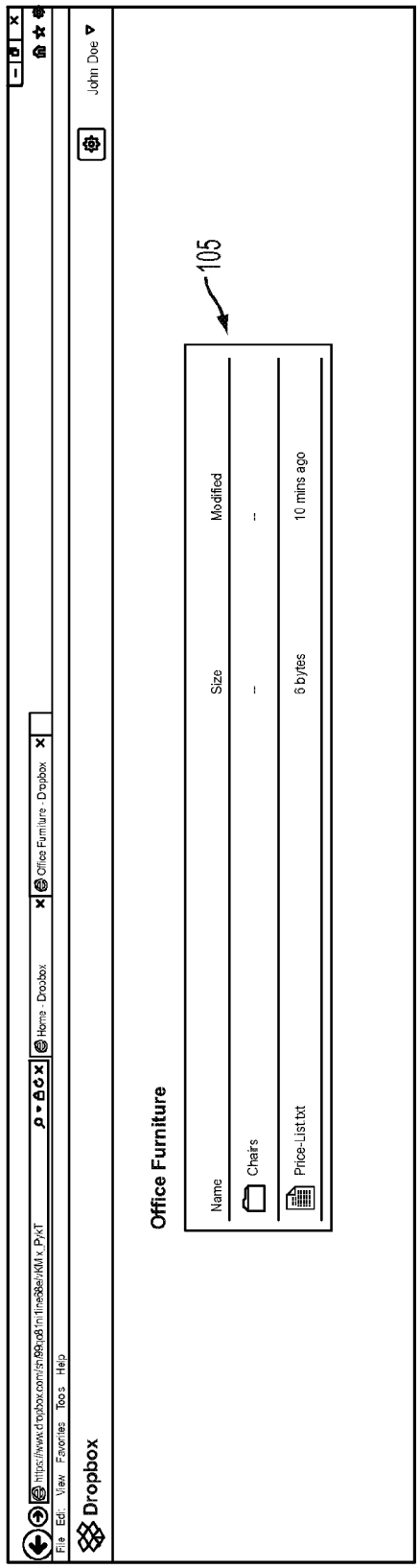
FIG. 2 is a get link screen for the Office Furniture folder shown in FIG. 1. This screen shows a preview of what a user will see when they enter the displayed link into a browser. The listed files and folders are shown in list format.

In particular embodiments, when one or more files/folders are shown in list format, the files are simply displayed as a list of files. For example, as shown in FIG. 1, each item in the displayed list includes the name of the file, which is displayed on the same line as other pertinent file information (such as an icon indicating the file's file type and the date the file was last modified). The files may be displayed, for example, in the form of a vertical list that shows the files or folders in alphabetical order. In particular embodiments, in list format, rather than using an icon to indicate that a particular file is a picture file, the system may display a small thumbnail version of the picture adjacent its filename as discussed above. In particular embodiments, this small thumbnail version of the image is smaller than the "preview image" of the file discussed above (e.g., at least 20% smaller, 30% smaller, 40% smaller, or any other percentage smaller than the preview image).

Determination of Default View Format

In various embodiments, the system is configured to designate a default view format in which the listing of files and folders will be displayed (if possible) when the recipient uses the link to access the listing of files and folders. As discussed in greater detail below, this default view may be determined based, for example, on: (1) the type of files that are to be included in the listing; (2) a preference expressed by the content sharer; and/or (3) a preference expressed by the content recipient.

Automatically Determining Default View Based on File Type

In particular embodiments, the default view format may be based, for example, on the types of files that will be included in the listing. For example, in particular embodiments, the system is adapted so that, if the listing of files and folders includes any image files (e.g., photo, video or PowerPoint files), the listing of files and folders will be displayed by default in gallery format when the recipient uses the link to access the listing of files and/or folders. Similarly, the system may be adapted so that, if the listing of files and/or folders includes no files of a particular set of one or more file types (e.g., no image files), the listing of files and folders will be displayed, by default, in list format when the recipient uses the link to access the listing of files and folders.

Determining Default View Based on Content Sharer's Preference

Figure 4:
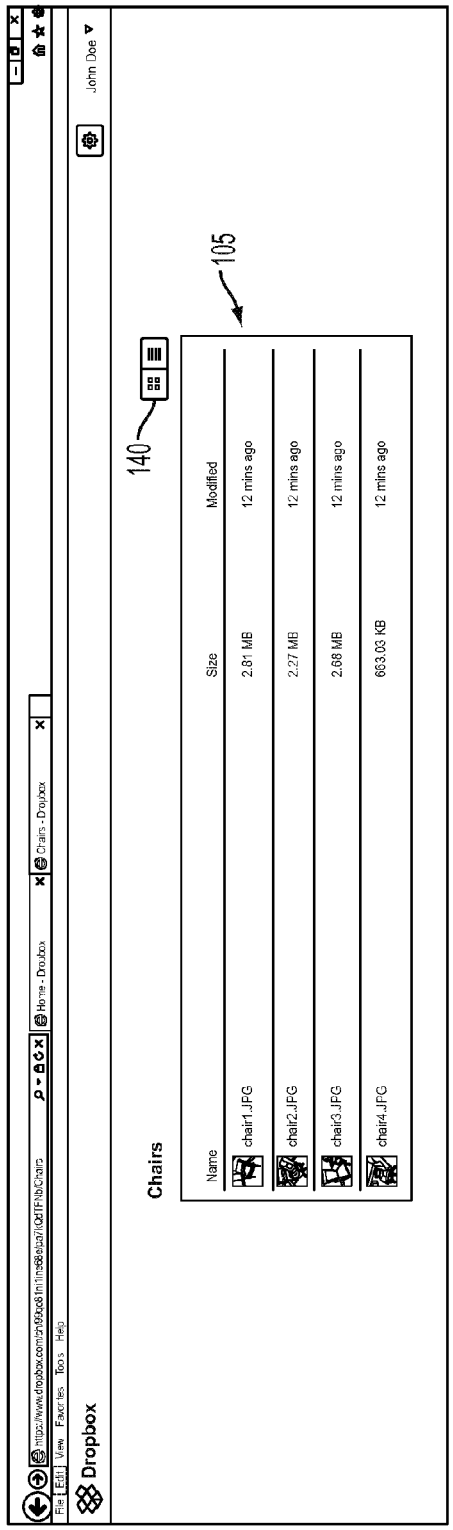
FIG. 4 is a get link screen for the Chairs folder shown in FIG. 2. The listed files are shown in list format.

In certain embodiments, the system may be configured to allow the content sharer to specify the default format in which the listing of files and folders will be displayed when the recipient uses the link to access the listing of files and folders. The content sharer may do this in a link preview screen that displays what the content recipient will see when following the link shared by the content sharer. As shown in FIG. 4, in the link preview screen, the system's user interface may include a toggle button 140 that a content sharer may select to toggle between list and gallery view formats for a particular list of files.

In particular embodiments, as the content sharer switches between these two view formats, the displayed URL is modified to reflect whether the files/folders are displayed, by default if possible, in list view format or gallery view format. In particular, the system may be adapted so that, when the content sharer changes the default display format of a particular file/folder listing as discussed above, the system automatically modifies the link (e.g., the URL) to correspond to the selected default display format. For example, the system may add additional characters to the URL that a system (e.g., a synched file system, such as that provided by Dropbox) will parse out of the URL when the recipient types the URL into a browser. The system then uses the additional characters to determine which format to use as a default format in displaying to the content recipient the listing of files and/or folders.

This causes the sharer's preference regarding the display format to be "sticky" or "persistent", meaning that, for example, when the sharer shares the modified URL with a particular content recipient, the recipient will see the files/folders in the format (e.g., gallery or list format) in which the sharer viewed the files immediately before sending the URL to the recipient. (In other embodiments, the default view associated with the content may be controlled in a way other than modifying the URL, such as tracking the current default view in a database.)

In particular embodiments, the above-referenced persistence applies, if possible, throughout all folders and subfolders of files accessed through the URL. For example, if a content sharer creates a link that specifies gallery view format as the default view format, the system will use the gallery view format as the default view format for all applicable folders and subfolders in the preview screen unless the content sharer uses the toggle button to change the default view.

As a more particular example, consider a situation in which a content sharer creates a link to a folder of .jpg image files that includes a subfolder of .doc files, which itself includes a subfolder of .tiff image files. In this example, the link specifies that the default view format is gallery view format. In this particular example, the folder of .jpg image files will be shown to the content sharer in the preview screen in gallery view format since the default view format is gallery view format. However, if the content sharer then selects the subfolder of .doc files, the system will display the listing of .doc files in list view format since, in particular embodiments, the system is configured to display lists of files that include no image files in list view format, not gallery view format. However, if the recipient then selects the subfolder of .tiff files, the system will display the folder in gallery format since the link specifies that gallery is the default format for the files/folders. As discussed above, in various embodiments, if the content sharer uses the toggle button 140 to change the default view format, the system will again modify the URL (e.g., as described above) to reflect the current default display mode and will display all folders/files, if possible, in the new default display mode.

Determining Default View Based on Content Recipient's Preference

The system may also be adapted to allow the recipient (after receiving and following the link) to use a toggle button 140 to specify the default format in which the listing of files and folders will be displayed. In particular embodiments, as the content recipient switches between the list view format or gallery view formats, the displayed URL is modified (e.g., as discussed above) to reflect whether the files/folders are displayed, by default if possible, in the currently displayed (list or gallery) view format.

This causes the content recipient's preference regarding the display format to be "sticky" or "persistent". As discussed above, this means that, in various embodiments, when the content recipient uses the modified URL or shares the modified URL with another content recipient, the other content recipient will see the files/folders in the format (e.g., gallery or list format) in which the initial content recipient viewed the files immediately before sending the URL.

In particular embodiments, the above-referenced persistence applies, if possible, throughout all folders and subfolders of files accessed through the URL. For example, as described above, if a content recipient receives a link that specifies gallery view format as the default view format, the system will use the gallery view format as the default view format for all applicable folders and subfolders accessed using the link unless the recipient uses the toggle button to change the default view.

Determination of View Based on Device Used to Display View

In various embodiments, the default display format may be overridden based on the type of device that the user is using to access the listing of the relevant files and/or folders. For example, the system may be adapted so that if a user enters the URL into a browser on a portable device (e.g., a cellular phone), the system will only display the list of files and/or folders in a particular format (e.g., list format) that is suitable for display on the portable device. The system may make this decision based, for example, on user agent information received from the browser on the user's computing device (e.g., portable device). This information may include, for example, the type of device that the user is using to access the system, the browser the user is currently using, and other information.

Display of Non-JPEG Files in Gallery Format

In particular embodiments, the system is adapted so that, when it displays non-JPEG image files in gallery view format, it first transcodes the image files into .jpg format, and then renders the image as a JPEG image. However, the system may be adapted to allow a user to selectively download the file in its original (e.g., non-JPEG) format. For example, the system may be configured so that when a user right-clicks on the image, the system displays a "download in original format" option in a list of selectable options. The user may then download the photo to their computer by selecting the "download in original format" button.

Example User Experience

Figure 7:
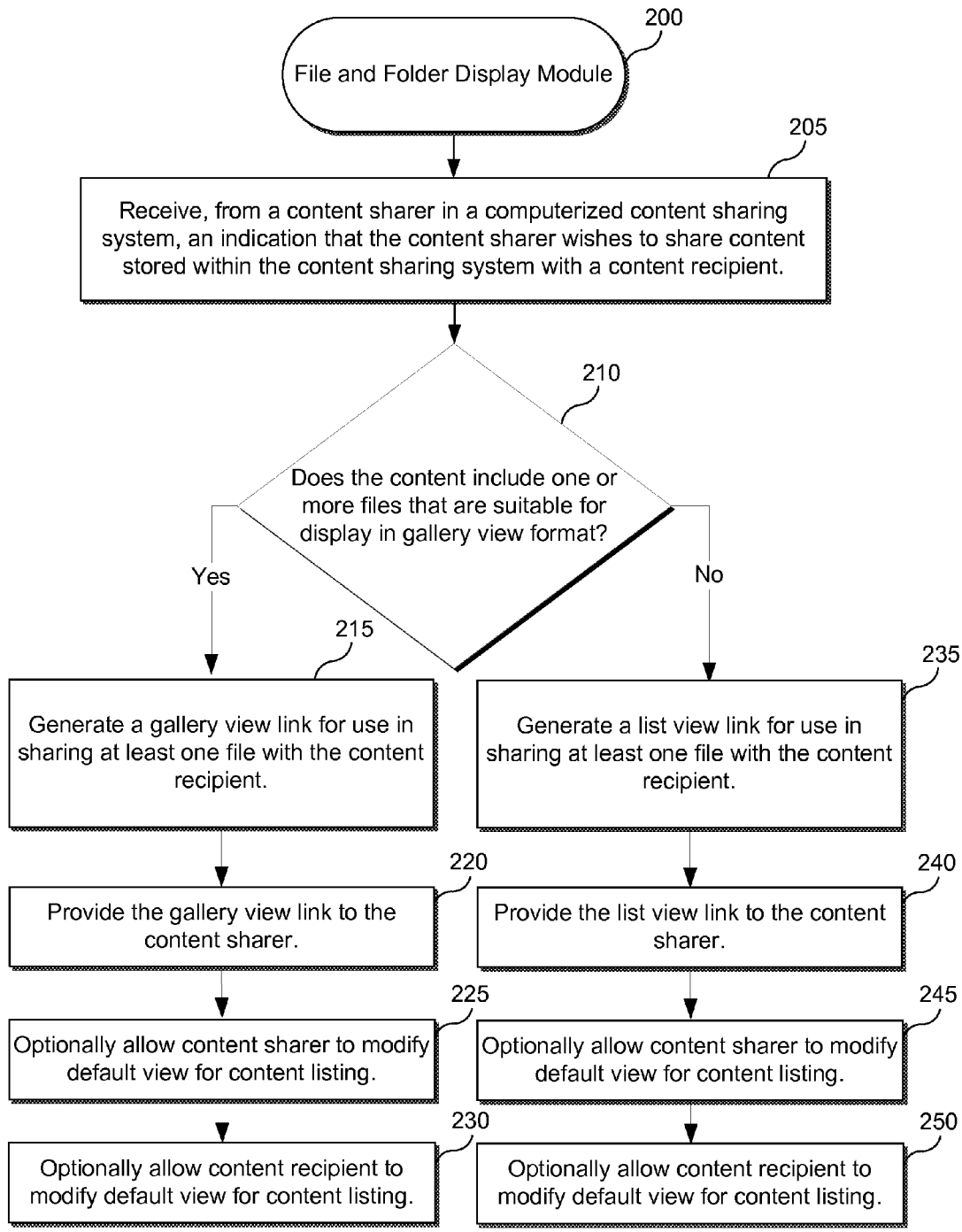
FIG. 7 is a flow chart of a file and folder display module according to a particular embodiment.

FIG. 7 is a flow chart that demonstrates an exemplary flow of a file and folder display module 200 by which a File Management Server 400 (described below in the discussion of FIGS. 8 and 9) can provide particular embodiments of a file sharing service. (In various embodiments, the instructions 422 shown in FIG. 9 include the folder display module 200.) As shown in FIG. 7, the file and folder display module 200 begins at Step 205 where it receives, from a content sharer in the context of a computerized content sharing system, an indication that the content sharer wishes to share content stored within the content sharing system with a content recipient.

FIGS. 1-6 may be used to understand the context in which the flow of FIG. 7 takes place. For example, FIG. 1 shows a user home page according to a particular embodiment. This home page includes a folder structure 105 that includes multiple folders and a single .pdf file 125 that are displayed in list format. In this example, at Step 205, a user may indicate that they wish to share one of the displayed files or folders via a link that is generated by the system. In a particular embodiment, in order to generate such a link, the user may select an appropriate indicia (e.g., a chain link indicia 130) that is positioned adjacent the folder or file to be shared.

Returning to FIG. 7, the system advances to Step 210, where it determines whether the content includes one or more files that are suitable for display in gallery view format. If so, the system progresses to Step 215, where it generates a gallery view link for use in sharing the content with the content recipient. At Step 220, the system then provides the gallery view link to the content sharer by, for example, displaying the gallery view link in a new browser window on the content sharer's computer.

Figure 3:
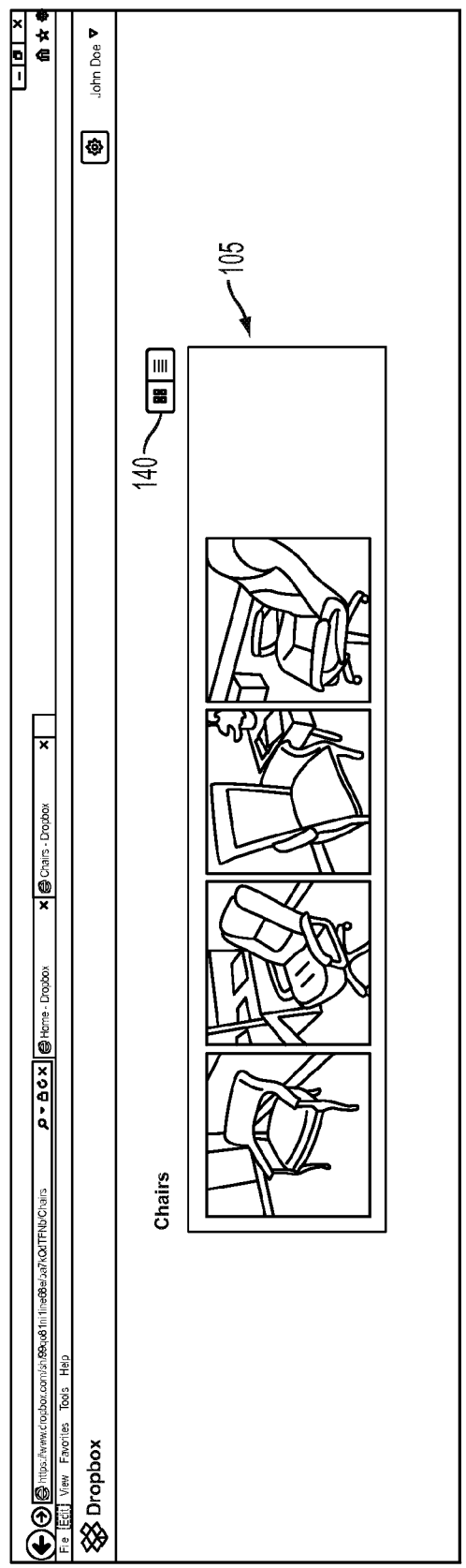
FIG. 3 is a get link screen for the Chairs folder shown in FIG. 2. The listed files are shown in gallery format.

In particular embodiments, the system may display the gallery view link in a new window of the user's browser along with a preview of the files to be shared in gallery view. An example of this is shown in FIG. 3. The system may also optionally, at Step 225, allow a content sharer to modify the default view for the content listing. For example, as shown in FIG. 3, the system may display a toggle button 140 (or other suitable button) that the user may use to specify a different default view for the files. In the example shown in FIG. 3, if the user selects the toggle button 140 once, the system will display the files in list view. (FIG. 4 shows an example of such a view.) Selecting the toggle button 140 again will cause the system to again display the files in gallery view.

Once the content sharer is satisfied with the default view for the content, the content sharer communicates the link to the content to the content recipient in any suitable manner. For example, the content sharer may e-mail or text the link to the content recipient, post the link to a web site, etc. The content recipient may then view a listing of the content (e.g., in the current default view) by selecting the provided link.

Turning again to FIG. 7, in various embodiments, at Step 230, the system may allow the content recipient to modify the default view for the content listing. The content recipient may do this, for example, by using a toggle button in the manner described generally above. The content recipient may then use the link (or modified version of the link) to view a selectable listing of the content in their specified default view, or to share the content with another content recipient.

Returning to Step 210, if the system determines that the content does not include one or more files that are suitable for display in gallery format, the system proceeds to Step 235 where it generates a list view link for use in sharing the content with the content recipient in list view (as the default view). At Step 240, the system then provides the list view link to the content sharer, for example in the manner generally described above in regard to Step 220. At Steps 245 and 250, the system optionally allows the content sharer and/or the content recipient to modify the default view for the content listing as described above in regard to Steps 225 and 230.

As an aside, Steps 245 and 250 occur in a line of the flow chart of FIG. 7 in which the system has previously determined that the content does not include one or more files that are suitable for display in gallery view format. It is noted that one or more subfolders may include image files, and that changing the default view to gallery view will change how those files are displayed if the content sharer (in the link preview screen) or the content recipient (after following the shared link) navigates to such a subfolder. Also, it is noted that the default view will apply over time, as different types of files are added to or removed from the folders and subfolders at issue.

Example System Architecture

Figure 8:
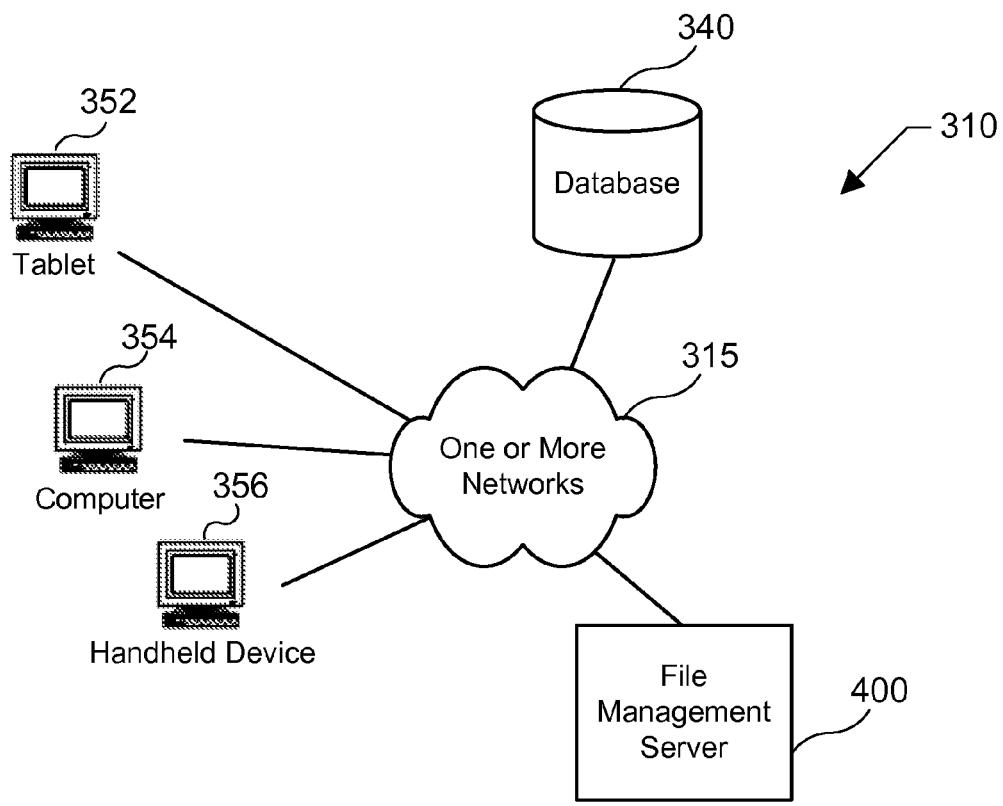
FIG. 8 is a block diagram of a File Management System according to one embodiment.

FIG. 8 is a block diagram of a File Management System 310 according to a particular embodiment. As may be understood from this figure, the File Management System 310 includes one or more computer networks 315, a File Management Server 400 (which, for example, may be used to execute the File and Display Module 200 discussed above), a Database 340 (which, for example, may be used to store the content discussed above), and one or more remote computing devices such as a tablet computer 352, a desktop or laptop computer 354, or a handheld computing device 356, such as a cellular phone). In particular embodiments, the one or more computer networks facilitate communication between the File Management Server 400, Database 340, and the one or more remote computing devices 352, 354, 356.

The one or more computer networks 315 may include any of a variety of types of wired or wireless computer networks such as the Internet, a private intranet, a public switch telephone network (PSTN), or any other type of network. The communication link between the File Management Server 400 and the Database 340 may be, for example, implemented via a Local Area Network (LAN) or via the Internet.

Figure 9:
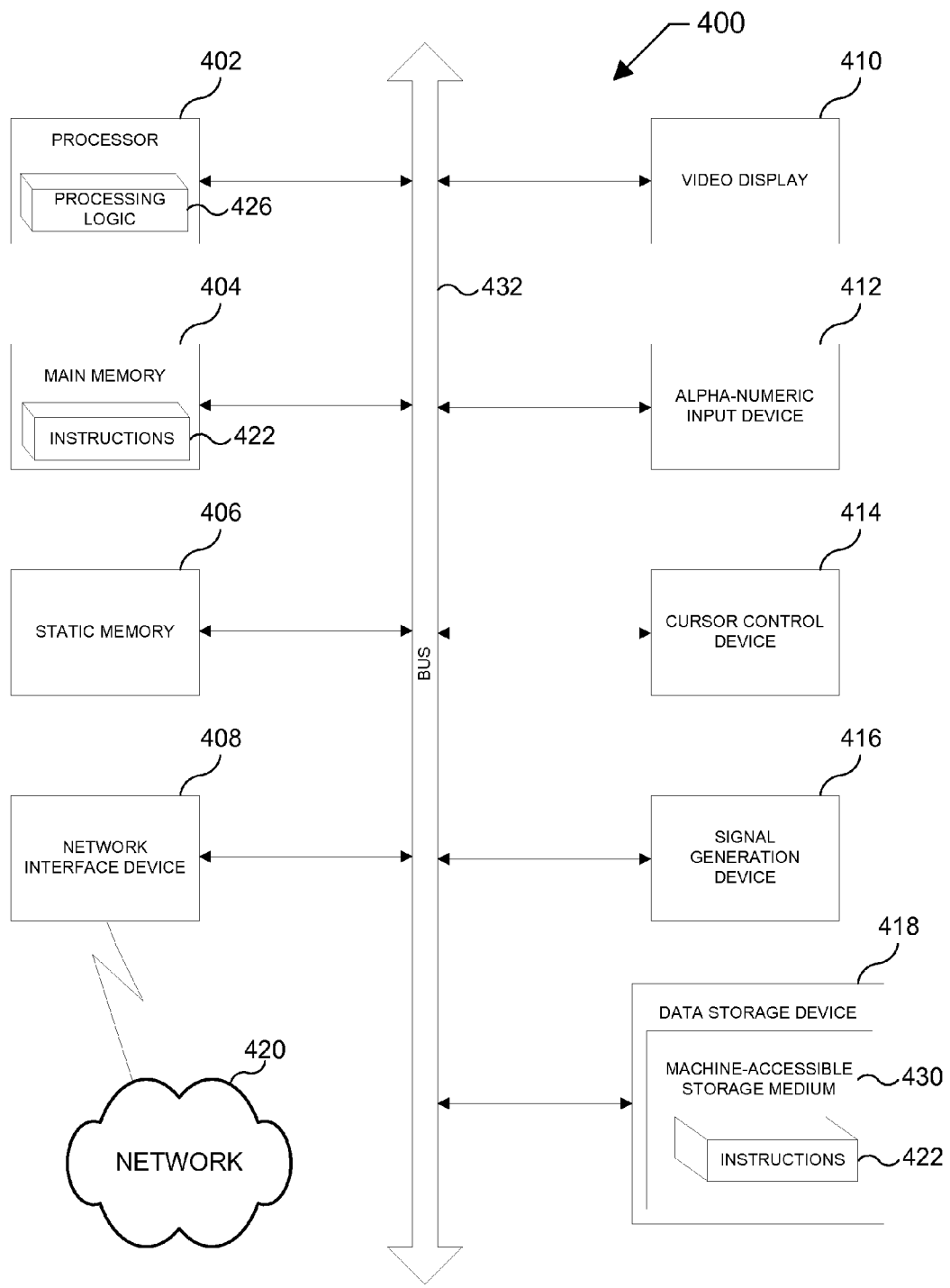
FIG. 9 is a block diagram of a computer that may be used, for example, as a client or server computer within the context of the File Management System of FIG. 8.

FIG. 9 illustrates a diagrammatic representation of a computer 400 that can be used within the file management system 310, for example, as a client computer (e.g., one of the client computers 352, 354, 356 shown in FIG. 8), or as a server computer (e.g., the File Management Server 400 shown in FIG. 8). In particular embodiments, the computer 400 may be suitable for use as a computer of a content sharer or as a computer of a content recipient as these computers operate as clients within the context of the file management system 310 to facilitate the sharing of files between a content sharer and a content recipient as discussed above.

In particular embodiments, the computer 400 may be connected (e.g., networked) to other computers in a LAN, an intranet, an extranet, and/or the Internet. The computer 400 may operate in the capacity of a server or a client computer in a client-server network environment, or as a peer computer in a peer-to-peer (or distributed) network environment. The computer 400 may be a personal computer (PC), a tablet PC, a set-top box (STB), a Personal Digital Assistant (PDA), a cellular telephone, a web appliance, a server, a network router, a switch or bridge, or any computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

The exemplary computer 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 432.

The processing device 402 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 may be configured to execute the processing logic 426 for performing various operations and steps discussed herein.

The computer 400 may further include a network interface device 408. The computer 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a non-transitory computer-accessible storage medium 430 (also known as a non-transitory computer-readable storage medium or a non-transitory computer-readable medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer 400, the main memory 404 and the processing device 402 also constituting computer-accessible storage media. The software 422 may further be transmitted or received over a network 420 via the network interface device 408.

While the computer-accessible storage medium 430 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" shall also be understood to include any medium that is capable of storing, encoding or carrying a set of instructions for execution by the computer and that cause the computer to perform any one or more of the methodologies of the present invention. The term "computer-accessible storage medium" shall accordingly be understood to include, but not be limited to, solid-state memories, optical and magnetic media, etc.

CONCLUSION

Many modifications and other embodiments of the invention will come to mind to one skilled in the art to which this invention pertains having the benefit of the teachings presented in the foregoing descriptions and the associated drawings. For example, although the system may be adapted to allow a user to use a toggle button to modify their default view format, in various embodiments, the system may be adapted to allow a user to change the default view format by manually editing the URL for the particular list of files/folders. Similarly, the system may be adapted to monitor a particular user's behavior in regard to view format preferences and to use this information to automatically set a default view format preference.

It should also be understood that, although various embodiments are described above as using a link (e.g., a URL) to provide user access to shared files (and listings of those files), any other suitable indicia may be used for this purpose.

Applicants note that the phrase "providing at least one of A or B" within the context of this application would cover, for example, all of the following: (1) providing at least one of A; (2) providing at least one of B; and (3) providing at least one of both A and B.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claims is:

1. A computer-implemented method comprising:
   receiving, from a content sharer in a computerized content sharing system, an indication that the content sharer wishes to share content stored within the content sharing system with a content recipient;
   automatically determining that the content includes one or more items suitable for display in a preview image format and one or more items suitable for display in a list view format;
   creating a link, by the content sharing system, that the content sharer may share with the content recipient, the link corresponding to an automatically determined, by the content sharing system, default view based on the content, wherein the automatically determined default view is a gallery view concurrently displaying at least one item in the preview image format and at least one item in the list view format;
   providing, by the content sharing system, the link to the content sharer for use in sharing the content with the content recipient; and
   after creating the link, the content sharing system, automatically changing the default view of a listing of the content based on an analysis, by the content sharing system, of the content recipient's pre-defined view format preferences, wherein when the link is activated by the content recipient the link provides a web page displaying the content in the default view based on the analysis of the content recipient's view format preferences.

2. The computer-implemented method of claim 1, wherein changing the default view of a list of the content based on an analysis of the content recipient's view format preferences comprises:
   monitoring the content recipient's behavior in regard to view format preferences to collect view format preference data;
   analyzing the collected view format preference data to determined a preferred view of a listing of content; and
   automatically changing the default view to the determined preferred view.

3. The computer-implemented method of claim 1, further comprising:
   determining a type of computing device that a content recipient is currently using to view the content; and
   in response to determining that the type of computing device falls within a predetermined category of computing devices, displaying a listing of the content in list view format regardless of a current default view for the content.

4. The computer-implemented method of claim 3, wherein the predetermined category of computing devices comprises wireless computing devices.

5. The computer-implemented method of claim 1, wherein an image file displayed in preview image format has substantially no identifying text adjacent the preview image.

6. The computer-implemented method of claim 5, wherein a name of the image file can be viewed by using a computer pointing device to hover over the preview image associated with the image file.

7. The computer-implemented method of claim 1, wherein when a list of the content is viewed in list view format, image files from within the content are represented by an indicia that includes alphanumeric text indicating the image file's title.

8. The computer-implemented method of claim 7, wherein the indicia comprises a small thumbnail version of the image file.

9. The computer-implemented method of claim 8, wherein the small thumbnail version of the image file is smaller than a preview image of the image file.

10. A computer-implemented method comprising:

receiving, from a content sharer in a computerized content sharing system, an indication that the content sharer wishes to share content stored within the content sharing system with a content recipient;

automatically determining that the content includes one or more items suitable for display in a preview image format and one or more items suitable for display in a list view format;

creating a link, by the computerized content sharing system, that the content sharer may share with the content recipient, the link corresponding to an automatically determined, by the computerized content sharing system, default view based on the content, wherein the automatically determined default view is a gallery view concurrently displaying at least one item in the preview image format and at least one item in the list view format;

providing, by the computerized content sharing system, the link to the content sharer for use in sharing the content with the content recipient;

after creating the link corresponding to the default view, the computerized content sharing system, automatically changing the default view of a listing of the content based on an analysis of the content sharer's pre-defined view format preferences, wherein when the link is activated by the content recipient the link provides a web page displaying the content in the default view based on the analysis of the content sharer's view format preferences.

11. The computer-implemented method of claim 10, wherein changing the default view of a list of the content based on an analysis of the content sharer's view format preferences comprises:

monitoring the content sharer's behavior in regard to view format preferences to collect view format preference data;

analyzing the collected view format preference data to determined a preferred view of a listing of content; and automatically changing the default view to the determined preferred view.

12. The computer-implemented method of claim 10, further comprising:

determining a type of computing device that a content recipient is currently using to view the content; and in response to determining that the type of computing device falls within a predetermined category of computing devices, displaying a listing of the content in list view format regardless of a current default view for the content.

13. The computer-implemented method of claim 12, wherein the predetermined category of computing devices comprises wireless computing devices.

14. The computer-implemented method of claim 10, wherein an image file displayed in preview image format has substantially no identifying text adjacent the preview image.

15. The computer-implemented method of claim 14, wherein a name of the image file can be viewed by using a computer pointing device to hover over the preview image associated with the image file.

16. The computer-implemented method of claim 10, wherein when a list of the content is viewed in list view format, image files from within the content are represented by an indicia that includes alphanumeric text indicating the image file's title.

17. The computer-implemented method of claim 16, wherein the indicia comprises a small thumbnail version of the image file.

18. The computer-implemented method of claim 17, wherein the small thumbnail version of the image file is smaller than a preview image of the image file.

19. A computer-implemented method comprising:

receiving, from a content sharer in a computerized content sharing system, an indication that the content sharer wishes to share a first set of content stored within the content sharing system with a content recipient;

automatically determining that the first set of content includes one or more items suitable for display in a preview image format and one or more items suitable for display in a list view format;

creating a link, by the computerized content sharing system, that the content sharer may share with the content recipient, the link corresponding to an automatically determined, by the computerized content sharing system, default view based on the first set of content, wherein the automatically determined default view is a gallery view concurrently displaying at least one item in the preview image format and at least one item in the list view format;

providing, by the computerized content sharing system, the link to the content sharer for use in sharing the first set of content with the content recipient; and after creating the link, the computerized content sharing system, automatically changing the default view of a listing of the first set of content to a first preferred view based on an analysis, by the computerized content sharing system, of the content recipient's pre-defined view format preferences and the first set of content, wherein when the link is activated by the content recipient the link provides a web page displaying the first set of content in the default view based on the analysis of the content recipient's view format preferences.

20. The computer-implemented method of claim 19 further comprising:

receiving, from a content sharer in a computerized content sharing system, an indication that the content sharer wishes to share a second set of content stored within the content sharing system with the content recipient;

determining that the second set of content includes one or more items suitable for display in a preview image format and one or more items suitable for display in a list view format;

creating a link that the content sharer may share with the content recipient, the link corresponding to an automatically determined default view based on the second set of content, wherein the automatically determined default view is a gallery view listing at least one item in the preview image format and at least one item in the list view format;

providing the link to the content sharer for use in sharing the second set of content with the content recipient; and after creating the link, automatically changing the default view of a listing of the second set of content to a second preferred view based on an analysis of the content recipient's view format preferences and the second set of content, wherein when the link is activated by the content recipient the link provides a web page displaying the second set of content in the default view based on the analysis of the content recipient's view format preferences.

* * * * *